(12) United States Patent
Sawa

(10) Patent No.: US 6,838,210 B2
(45) Date of Patent: Jan. 4, 2005

(54) SOLID ELECTROLYTE WITH HIGH ION CONDUCTIVITY AND ELECTROCHEMICAL SYSTEM USING THE SOLID ELECTROLYTE

(75) Inventor: Haruo Sawa, Kochi-ken (JP)

(73) Assignee: Nippon Kodoshi Corporation, Kochi-Ken (JP)

( * ) Notice: Subject to any disclaimer, the term of this patent is extended or adjusted under 35 U.S.C. 154(b) by 0 days.

(21) Appl. No.: 10/359,063

(22) Filed: Feb. 6, 2003

(65) Prior Publication Data

US 2003/0150719 A1 Aug. 14, 2003

(30) Foreign Application Priority Data

Feb. 13, 2002 (JP) ........................................ 2002-035832

(51) Int. Cl.⁷ ........................... H01M 10/08; C25C 7/00
(52) U.S. Cl. ..................... 429/188; 252/62.2; 429/189; 429/318; 204/296
(58) Field of Search .......................... 429/188, 30, 189, 429/304; 204/296; 252/62.2

(56) References Cited

U.S. PATENT DOCUMENTS

| | | | | |
|---|---|---|---|---|
| 4,448,493 A | * | 5/1984 | Matsudaira et al. | ......... 359/268 |
| 4,734,344 A | * | 3/1988 | Choi | ........................... 429/206 |
| 5,298,348 A | * | 3/1994 | Kung | ........................... 429/101 |
| 5,389,471 A | * | 2/1995 | Kung | ........................... 429/206 |

OTHER PUBLICATIONS

Yong–Ming Li et al., "Proton Conductivity of Some Hydrated Compounds at Intermediate Temperature up to 150° C under High Water Vapor Pressure", Electrochemistry, 60, No. 3 (2001), pp. 2–5.

Osamu Nakamura et al., "High–Conductivity Solid Proton Conductors: Dodecamolybdophosphoric Acid and Dodecatungstophosphoric Acid Crystals", Chemistry Letters, 1979, pp. 17–18.

Masayuki Nagami et al., "Fast Protonic Conductors of Water–Containing $P_2O_5$–$ZrO_2$–$SiO_2$ Glasses", J.Electrochem. Soc., vol. 144, No. 6, Jun. 1997, pp. 21752178.

P.H.L. Notten, "Optical Switching of Y–Hydride Thin Film Electrodes", J.Electrochem. Soc., vol. 143, No. 10, Oct. 1996, pp. 3348–3353.

Katsumi Kuwabara, "On a Solid–State ECD, $WO_3$/Solid Electrolyte/Metal", Bull.Chem.Soc.Jpn., vol. 60, No. 2, 1987, pp. 747–752.

S. Petty–Weeks et al., "Differential Scanning Calorimetry and Complex Admittance Analysis of $PVA/H_3PO_4$ Proton Conducting Polymer Blends", Sensors and Actuators, 11 (1987), pp. 377–386.

Nobuo Yamada et al., "Oxygen–utilization Performance of Trickle–bed Cathode for On–site Electrochemical Production of Hydrogen Peroxide", Electrochemistry, 69, No. 3 (2001), pp. 154–159.

* cited by examiner

*Primary Examiner*—Mark Ruthkosky
(74) *Attorney, Agent, or Firm*—Shlesinger, Akwright & Garvey LLP

(57) ABSTRACT

It is an object to provide a high ion conductive solid electrolyte which uses organic and inorganic complex compound having water absorption and water resistance and to provide an electrochemical system using the high ion conductive solid electrolyte. The high ion conductive solid electrolyte is composed of a complex compound including water that has zirconic acid compound and polyvinyl alcohol. An aqueous solution in which zirconium salt or oxyzirconnium salt and polyvinyl alcohol are dissolved is neutralized by alkali. After removing water used as solvent, unnecessary salts are removed from the neutralized solution. The high ion conductive solid electrolyte is obtained which is composed of the complex compound having zirconic acid compound, polyvinyl alcohol, and water. Various electrochemical systems are obtained each of which use the high ion conductive solid electrolyte.

11 Claims, No Drawings

SOLID ELECTROLYTE WITH HIGH ION CONDUCTIVITY AND ELECTROCHEMICAL SYSTEM USING THE SOLID ELECTROLYTE

BACKGROUND OF THE INVENTION

The present invention relates to a proton conductive solid electrolyte with high ion conductivity or a hydroxide ion conductive solid electrolyte with high ion conductivity that is applicable to a fuel cell or the like, and an electrochemical system such as a fuel cell using the solid electrolyte with high ion conductivity.

Conventionally, an electrolytic device is realized such as a fuel cell, a dehumidifier, or an electrolytic hydrogen producing device, as an electrochemical system using a proton conductive solid electrolyte. For example, in a solid polymer fuel cell, current flows and electric energy is obtained in accordance with an electrochemical oxidative reaction of hydrogen supplied to a negative electrode that is indicated by the following formula (1), an electrochemical reduction of oxygen supplied to a positive electrode that is indicated by a formula (2), and a reaction based on proton motion in the electrolyte between the positive electrode and the negative electrode.

$$H_2 \rightarrow 2H^+ + 2e^- \quad (1)$$

$$\tfrac{1}{2}O_2 + 2H^+ + 2e^- \rightarrow H_2O \quad (2)$$

It is known a fuel cell using a methanol or the like instead of hydrogen as a fuel supplied to the negative electrode. Also in this case, the reaction is carried out in which the fuel is electrochemically oxidized at the negative electrode to release proton, in a similar manner. Therefore, it is possible to operate by using the proton conductive solid electrolyte.

For example of the electrolytic device, the electrolytic hydrogen producing device is realized. The electrolytic hydrogen producing device produces hydrogen on the basis of a reaction inverse to the reaction described in conjunction with the formulas (1) and (2) in the fuel cell. Inasmuch as it is possible to obtain high purity hydrogen in on-site by using only water and electric power in the electrolytic hydrogen producing device, it is unnecessary to have a hydrogen gas cylinder. In addition, it is possible to easily carry out electrolysis by introduction of pure water having no electrolyte solute owing to employ the solid electrolyte. Also in paper industry, a similar system is attempted to manufacture hydrogen peroxide for bleach by the electrolytic method using the following formula (3) (referring to Electrochemistry, 69, No.3, 154–159 (2001)).

$$O_2 + H_2O + 2e^- \rightarrow HO_2^- + OH^- \quad (3)$$

The dehumidifier has a structure in which the proton conductive solid electrolyte film is sandwiched between the positive electrode and the negative electrode, in a manner similar to the fuel cell or the hydrogen producing device. When a voltage is applied between the positive electrode and the negative electrode, water is split into proton and oxygen at the positive electrode in accordance with the reaction indicated by the following formula (4). The proton moves through the solid electrolyte to the negative electrode to be subjected to a reaction indicated by a formula (5). As a result, the union of the proton and the oxygen of air forms water. As a result of these reactions, water moves from the positive electrode to the negative electrode so that dehumidification is carried out in the positive electrode.

$$H_2O \rightarrow \tfrac{1}{2}O_2 + 2H^+ + 2e^- \quad (4)$$

$$\tfrac{1}{2}O_2 + 2H^+ + 2e^- \rightarrow H_2O \quad (5)$$

It is also possible to split water and to eliminate moisture, using the principle of operation that is similar to the electrolytic hydrogen producing device. Proposal is made as regards an air conditioner combined with a moisture evaporating cold blast device (referring to collected papers of national lecture in Institute of Electrical Engineers, P3373 (2000)).

In any one of the above-mentioned systems, perfluoro sulfonic acid type ion exchange membrane represented by Nafion is used as the solid electrolyte. In addition, various kinds of sensors, electrochromic device and the like are essentially a system based on a principal of operation similar to the above-mentioned. Inasmuch as these systems are driven when the proton moves in the electrolyte between a pair of positive and negative electrodes which carryout reduction and oxidation, respectively, it is possible to use the proton conductive solid electrolyte. At present, experimental study is carried out with respect to these systems using proton conductive solid electrolytes.

For a hydrogen sensor, variation of electrode potential based on the concentration of hydrogen is utilized. Proposal is made in the hydrogen sensor about using, for example, the solid electrolyte composed almost exclusively of polyvinyl alcohol, as the electrolyte (referring to Sensors and Actuators, 11,377–386 (1987)). Furthermore, it is also possible to be applied to a humidity sensor, using the variation of electrode potential or ion conductivity.

When an electric field is applied to the negative electrode of the electrochromic device by using $WO_3$ or the like, the electrochromic device makes a color on the basis of reaction indicated by the following formula (6) and can be used as a displaying device or a lightproof glass. In this system, proposal is made about $Sn(HPO_4)H_2O$ which is inorganic compound, as the solid electrolyte (referring to Bull. Chem. Soc. Jpn, 60, 747–752 (1987)).

$$WO_3 + xH^+ + xe^- \rightarrow H_xWO_3 \text{ (coloring)} \quad (6)$$

In addition, there are a primary battery, a secondary battery, an optical switch, and an electrolyzed water producing apparatus, as the electrochemical system which operates by using the proton conductive solid electrolyte in principal. For example, in a nickel hydride battery of the secondary battery, a hydrogen storing alloy is used as the negative electrode, a nickel hydroxide is used as the positive electrode, and an alkali electrolytic solution is used as the electrolytic solution. As indicated by formulas (7) and (8), the electrochemical reduction and oxidation occur with respect to the proton in the negative electrode, and hydrogen is stored in the hydrogen storing alloy, on charge and discharge.

$$\text{(charge) } H_2O + e^- \rightarrow H(\text{storing}) + OH^- \quad (7)$$

$$\text{(discharge) } H(\text{storing}) + OH^- \rightarrow H_2O + e^- \quad (8)$$

As indicated by formulas (9) and (10), the electrochemical oxidation and reduction occur with respect to the nickel hydroxide.

$$\text{(charge) } Ni(OH)_2 + OH^- \rightarrow NiOOH + H_2O + e^- \quad (9)$$

$$\text{(discharge) } NiOOH + H_2O + e^- \rightarrow Ni(OH)_2 + OH^- \quad (10)$$

The charge and discharge reaction holds in the battery while the proton or the hydroxide ion moves in the electrolyte. Although it is possible to use the proton conductive solid electrolyte in principal, the alkali electrolytic solution is used in the prior art.

Proposal is made in the optical switch about using yttrium as the negative electrode (referring to J. Electrochem. Soc., Vol. 143, No.10, 3348–3353 (1996)). When supplied with the electric field, yttrium is hydrogenated as indicated by formula (11) to allow the light to pass therethrough. As a result, it is possible to switch between the light transmission and the non-light transmission by electric field. Although it is possible to use the proton conductive solid electrolyte in principal in this system, the alkali electrolytic solution is used in the prior art.

$$Y + \tfrac{3}{2}H_2O + 3e \rightarrow YH_3 + 3OH \qquad (11)$$

The electrolyzed water is water which is produced by the electrolyzing reaction. Although availability is different between the reduction side and the oxidation side, the electrolyzed water has availability in a healthy effect, a bactericidal action, a detergent action, and a growth of farm products. It is possible to use the electrolyzed water in drinking water, food service water, detergent water, agricultural water or the like. The electrolyzing reaction is promoted when the water has the electrolyte. When the electrolyte is dissolved in water, it is often necessary to remove the electrolyte from the water on using the water. When the solid electrolyte is used as the electrolyte, it is unnecessary to remove the solid electrolyte from the water.

However, there is a problem in which the perfluoro sulfonic acid type electrolyte is expensive on account of complexity of manufacturing process although the perfluoro sulfonic acid type electrolyte is used in the fuel cell, the electrolysis type hydrogen producing device, the dehumidifier, or the like which is realized in the prior art, as the electrochemical system using the proton conductive solid electrolyte. By the economies of mass production, it is expected that a low-priced electrolyte is manufactured. However, there is limitation of the low-price. It is desired that a cheap alternate member appears presently.

By the way, the proton travels at a high speed by operation of water included in the solid in the proton conductive solid electrolyte which operates at an ordinary temperature. As a result, it is necessary for the alternate member to have sufficient water absorption. More particularly, the proton conductive solid electrolyte must further have water resistance inasmuch as most proton conductive solid electrolyte is used in a damp environment. In the conventional perfluoro sulfonic type electrolyte, the water, which is absorbed in the highly hydrophilic sulfonic acid group, transports the ion, and the poly-fluoro ethylene bone structure has a role for maintaining water resistance, chemical stability, high temperature durability.

The polyvinyl alcohol is an example of hydrocarbon polymers that is highly hydrophilic and cheap. It is possible to use the material having the proton conductivity by mixing phosphoric acid into the polyvinyl alcohol, as the hydrogen sensor or the like. Although the proton travels at high speed in as much as the polyvinyl alcohol has the high water absorption, there is a problem in which a material stability is low in the damp environment because the polyvinyl alcohol is soluble in water.

An inorganic hydrated compound is known as another material having a highly hydrophilic property and a high durability and water resistance. For example, the hydrated glass of $P_2O_5$—$ZrO_2$—$SiO_2$ that is produced by the sol-gel process absorbs much water to have a high proton conductivity and does not dissolve in water. The hydrated glass has a high stability in a high temperature that is specific to the inorganic compound (referring to J. Electrochem. Soc. Vol. 144, No.6, 2175–2178 (1997)).

However, Each of the inorganic hydrated compounds is brittle as a common weak point. More particularly, it is difficult to make each of the inorganic compounds to a thin film which is required in use of the solid electrolyte. Furthermore, an expensive metal alcoxide is used as a material in the sol-gel process and also it is difficult to reduce an equipment cost for manufacturing, because organic solvent such as alcohol is used in the sol-gel process. Although it is possible to apply powder of the above-mentioned $Sn(HPO_4).H_2O$ which is used in the electrochromic device, it is difficult to make the above-mentioned $Sn(HPO_4).H_2O$ to a film having a high strength and a gas diffusion restrictive function which are required in the fuel cell or the like. In addition, molybdophosphoric acid and tungstophosphoric acid are reported as inorganic compounds each of which has the high conductivity (referring to Chem. Lett., 17 (1979)). The molybdophosphoric acid is represented by composition formula of $H_3MoPO_{40}.29H_2O$. The tungstophosphoric acid is represented by composition formula of $H_3WPO_{40}.29H_2O$. Furthermore, each of $ZrO_2.nH_2O$, $SnO_2.H_2O$, and $Ce(HPO_4)_2$ is reported as the inorganic compound having the high conductivity (referring to Electrochemistry, 69, No.1 (2001)). It is difficult to make the thin film even though using the molybdophosphoric acid, the tungstophosphoric acid, or other materials.

Means is proposed which combines the hydrophilic organic polymer with the inorganic compound, as the method of overcoming the defects of the hydrophilic organic polymer and the inorganic compound. For example, a proton conductive material is proposed which is obtained by chemically bonding silicide to polyethylene oxide in a nano-technology, Unexamined Japanese Patent Publication Tokkai 2000-90946. Although the polyethylene oxide is a cheap and hydrophilic organic polymer similar to the polyvinyl alcohol, the polyethylene oxide dissolves in water when it is used singly. But, it is possible to make the polyethylene oxide have the water resistance when the polyethylene oxide is combined with silicide by using the sol-gel process. As a result, it is possible to obtain the material having a good durability in a high temperature. However, it is difficult to obtain a compound material by other methods instead of the sol-gel process. Disclosure is not made as regards the other methods. Therefore, there is a problem in which it is difficult to reduce the material cost and the manufacturing cost. In addition, proposal is made in Unexamined Japanese Patent Publication Tokkai 2001-35509 about an ion conductive material which is obtained by combining the organic compound such as polyethylene oxide with the inorganic compound such as the silicide and a proton conductive adding agent such as the tungstophosphoric acid or the molybdophosphoric acid. However, disclosure is made in Unexamined Japanese Patent Publication Tokkai 2001-35509 about only combining method based on the sol-gel process.

All of the above-mentioned conventional solid electrolytes are acid, respectively. The material, which is used as the electrode or other system configuring material, is limited to a material having an acid resistance, such as a noble metal. As a result, it is difficult to reduce the cost of entire system. When the solid electrolyte is acid, it is difficult to use the electrolyte in the primary battery, the secondary battery, and the optical switch, because the electrode and the active material are degraded by the solid electrolyte. Furthermore, the alkali liquid state electrolyte may leak which is used in the conventional primary battery and the conventional secondary battery.

In order to dissolve the problems of the above-mentioned ion conductive solid electrolyte, it is an object of the present invention to provide a high ion conductive solid electrolyte of a low price that uses an organic and inorganic complex compound having water absorbing property and water resisting property. It is another object of the present invention to provide an electrochemical system using the high ion conductive solid electrolyte.

In order to accomplish the above-mentioned objects, there is provided a high ion conductive solid electrolyte characterized by being composed of a complex compound which is produced by combining polyvinyl alcohol with zirconic acid compound having water. The complex compound is produced by removing unnecessary salts after neutralizing aqueous solution of polyvinyl alcohol and zirconium salt or oxyzirconnium salt by alkali and removing the water used as solvent. Furthermore, there is provided an electrochemical system using the high ion conductive solid electrolyte.

The complex compound composed of zirconic acid compound, polyvinyl alcohol, and water includes at least one selected from aluminum, silicon, boron, phosphorus, titanium, tungsten, molybdenum, tin, calcium, strontium, and barium compound. In case of producing the complex compound by a neutralizing method, the aqueous solution having the zirconium salt or the oxyzirconnium salt includes at least one selected from an aluminum salt, titanium salt, calcium salt, strontium salt, barium salt, and boric acid, or the alkali for neutralizing the aqueous solution includes at least one of alkali metal salt selected from silicic acid, boric acid, phosphoric acid, tungstic acid, molybdic acid and stannic acid. As a result, the produced complex compound includes at least one selected from aluminum, silicon, boron, phosphorus, titanium, tungsten, molybdenum, tin, calcium, strontium and barium compound. In addition, a ratio of the zirconic acid compound weight converted into $ZrO_2$ weight to the polyvinyl alcohol weight is not less than of a ratio of 0.01. Preferably, the ratio of the zirconic acid compound weight converted into $ZrO_2$ weight to the polyvinyl alcohol weight is not less than of a ratio of 0.07. The complex compound may be subjected to an immersing treatment under an acid solution. Alternatively, the complex compound may be subjected to an immersing treatment under an alkali solution.

The complex compound is applicable to the electrochemical system such as a fuel cell, a steam pump, a dehumidifier, an air conditioner, an electrochromic device, an electrolytic device, an electrolytic hydrogen producing device, an electrolytic hydrogen peroxide producing apparatus, an electrolyzed water producing apparatus, a humidity sensor, a hydrogen sensor, a primary battery, a secondary battery, an optical switch system, or a new battery system using a multivalent metal.

According to the high ion conductive solid electrolyte of the present invention and the electrochemical system using the high ion conductive solid electrolyte of the present invention, it is possible to produce the high ion conductive solid electrolyte with a simple process which neutralizes the zirconium salt or the oxyzirconnium salt and other additional salts in the solution having the polyvinyl alcohol. On the basis of the above-mentioned neutralization and the heating treatment, condensation polymerization occurs with respect to the zirconic acid compound and the compounds produced from the other additional salts. Entwining occurs between the polyvinyl alcohol and these compounds in micron order. As a result, it is possible to form the complex compound. Inasmuch as the each of the polyvinyl alcohol, the zirconic acid compound, and the other additional compounds are hydrophilic, the complex compound has ability to include much water. The included water acts as a media which makes protons or hydroxide ions diffuse at high speed.

The polyvinyl alcohol is strongly joined to the zirconic acid compound and the other additional compounds by hydrogen bond or dehydration condensation. Although each of the polyvinyl alcohol, the zirconic acid compound, and the other additional compounds has hydrophilic, the complex compound is not dissolved in hot water and it is possible to keep a stable physicality in a high temperature and wet environment. The complex compound has strength and flexibility and it is easy to manufacture the complex compound to a thin film. Although the complex compound given by only zirconic acid compound possesses a high ion conductivity, it is possible to maintain or improve the high ion conductivity when the produced complex compound includes at least one selected from aluminum, silicon, boron, phosphorus, titanium, tungsten, molybdenum, tin, calcium, strontium, and barium compound. The complex compound or the complex material has the high ion conductivity in an alkali form. In addition, it is possible to process the complex compound in an alkali solution, without using acidic solution having a high causticity for a metal material.

PREFERRED EMBODIMENTS OF THE INVENTION

Description will be made as regards a high ion conductive solid electrolyte according to an embodiment of the present invention and an electrochemical system using the high ion conductive solid electrolyte according to an embodiment of the present invention. In the present invention, the solid electrolyte consists of the complex compound of micron order from the polyvinyl alcohol, the zirconic acid compound, aluminum, silicon, boron, phosphorus, titanium, tungsten, molybdenum, tin, calcium, strontium, and barium compound, which is manufactured in the aqueous solution. The complex compound is cheap and has the high ion conductivity. The present invention provides a proton or hydroxide ion conductive solid electrolyte having a high water resistance and provides an electrochemical system using the solid electrolyte.

In the present invention, zirconium salt or the oxyzirconium salt and other additives aluminum salt, titanic salt, calcium salt, strontium salt, barium salt, or boric acid is neutralized with polyvinyl alcohol by an alkali including an alkali metal salt of silicic acid, boric acid, phosphoric acid, tungstic acid, molybdic acid, or stannic acid, in the solution which polyvinyl alcohol coexists. After removing the water used as solvent, the complex compound used as the solid electrolyte composed of zirconic acid compound, aluminum, silicon, boron, phosphorus, titanium, tungsten, molybdenum, tin, calcium, strontium, and barium compound, polyvinyl alcohol, and water, is obtained by removing unnecessary salt.

Description will proceed to an embodiment according to the present invention hereinafter. Incidentally, the present invention is not limited to the description of the embodiment.

(Embodiment 1)

On producing electrolytic film, a predetermined amount of zirconium oxychloride octahydrates ($ZrCl_2O \cdot 8H_2O$) is dissolved in 2 weight % solution 80 cc of mixture which is obtained to mix the polyvinyl alcohol having average molecular mass of 120,000–190,000 and saponification degree of 87–89% with the polyvinyl alcohol having average molecular mass of 18,000–26,000 and saponification of 100%, in 50 weight % of each polyvinyl alcohol, in order to obtain a primary solution. Sodium hydroxide of 1M concentrations is dropped into the primary solution with agitation until pH is not less than 8. After that, the solution pours into two petri dishes each of which has a diameter of 90 mm and is dried under a temperature of 50° C., in order to remove water used as solvent. After the dry process, a film remaining on each petri dish is stripped off from the petri dish to be subjected to a heating treatment in an oven under a temperature of 100° C. during three hours in air. Furthermore, the thin film is cleaned in hot water of 70–80° C. after the heating treatment.

The electrolytic film is subjected to an acid immersing treatment in order to promote a proton form of the electrolytic film. Alternatively, the electrolytic film may be subjected to an alkali solution immersing treatment in order to promote an alkali form of the electrolytic film. In the acid immersing treatment, the electrolytic film is immersed in hydrochloric acid of 1.2M concentrations under the room temperature during three hours. After that, the electrolytic film is significantly washed. In the alkali solution immersing treatment, the electrolytic film is immersed in sodium hydroxide of 0.02M concentrations under the room temperature during three hours and a surface of the sample is wiped off without washing after drying.

The samples produced in a manner as described above are represented as samples No.1 to No.8 in Table 1. The amount of zirconic acid compound is converted to $ZrO_2$ weight in each of the samples No.1 to No.8 and the ratios to the polyvinyl alcohol weight are represented in Table 1. Incidentally, a symbol (a) is labeled to the sample subjected to the acid immersing treatment in Table 1. A symbol (b) is labeled to the sample subjected to the alkali immersing treatment in Table 1. A symbol is not labeled to the sample which is subjected to neither the acid immersing treatment nor the alkali immersing treatment.

TABLE 1

Ion conductivity of polyvinyl alcohol/zirconic acid complex electrolytic film

| Sample No. | weight ratio of zirconic acid compound to polyvinyl alcohol | weight ratio of addition compound to polyvinyl alcohol | ion conductivity (S/cm) |
|---|---|---|---|
| 1 | 0.011 | — | $3.3 \times 10^{-8}$ |
| 2 | 0.011 | — | (b) $2.1 \times 10^{-7}$ |
| 3 | 0.067 | — | $8.2 \times 10^{-8}$ |
| 4 | 0.067 | — | (b) $1.2 \times 10^{-6}$ |
| 5 | 0.134 | — | $1.7 \times 10^{-7}$ |
| 6 | 0.134 | — | (b) $1.9 \times 10^{-5}$ |
| 7 | 0.201 | — | $9.9 \times 10^{-7}$ |
| 8 | 0.201 | — | (b) $1.5 \times 10^{-5}$ |
| 9 | 0.134 | (Al) 0.028 | $5.6 \times 10^{-7}$ |
| 10 | 0.134 | (Al) 0.028 | (b) $2.1 \times 10^{-5}$ |
| 11 | 0.134 | (Si) 0.032 | $5.1 \times 10^{-7}$ |
| 12 | 0.134 | (Si) 0.032 | (b) $3.1 \times 10^{-5}$ |
| 13 | 0.134 | (B) 0.006 | $2.9 \times 10^{-7}$ |
| 14 | 0.134 | (B) 0.006 | (b) $1.1 \times 10^{-5}$ |
| 15 | 0.134 | (P) 0.035 | $3.3 \times 10^{-7}$ |
| 16 | 0.134 | (P) 0.035 | (a) $3.4 \times 10^{-6}$ |
| 17 | 0.134 | (P) 0.035 | (b) $1.4 \times 10^{-5}$ |
| 18 | 0.134 | (Ti) 0.044 | $9.1 \times 10^{-7}$ |
| 19 | 0.134 | (Ti) 0.044 | (b) $2.0 \times 10^{-5}$ |
| 20 | 0.134 | (W) 0.179 | $5.9 \times 10^{-7}$ |
| 21 | 0.134 | (W) 0.179 | (a) $9.1 \times 10^{-6}$ |
| 22 | 0.134 | (W) 0.179 | (b) $2.1 \times 10^{-5}$ |
| 23 | 0.134 | (Mo) 0.078 | $2.2 \times 10^{-7}$ |
| 24 | 0.134 | (Mo) 0.078 | (b) $2.3 \times 10^{-5}$ |
| 25 | 0.134 | (Sn) 0.082 | $6.1 \times 10^{-7}$ |
| 26 | 0.134 | (Sn) 0.082 | (b) $3.1 \times 10^{-5}$ |
| 27 | 0.134 | (Ca) 0.061 | $4.1 \times 10^{-7}$ |
| 28 | 0.134 | (Ca) 0.061 | (b) $1.9 \times 10^{-5}$ |
| 29 | 0.067 | (Sr) 0.110 | $6.7 \times 10^{-7}$ |
| 30 | 0.067 | (Sr) 0.110 | (b) $1.2 \times 10^{-4}$ |
| 31 | 0.100 | (Sr) 0.110 | $4.8 \times 10^{-7}$ |
| 32 | 0.100 | (Sr) 0.110 | (b) $3.8 \times 10^{-5}$ |
| 33 | 0.067 | (Ba) 0.163 | $1.2 \times 10^{-7}$ |
| 34 | 0.067 | (Ba) 0.163 | (b) $1.5 \times 10^{-5}$ |
| 35 | 0.067 | (Ba) 0.243 | $4.7 \times 10^{-6}$ |
| 36 | 0.067 | (Ba) 0.243 | (b) $4.5 \times 10^{-4}$ |
| 37 | 0.134 | (Ba) 0.082 | $1.4 \times 10^{-7}$ |
| 38 | 0.134 | (Ba) 0.082 | (b) $1.5 \times 10^{-4}$ |
| 39 | 0.077 | (P) 0.070 | $2.7 \times 10^{-6}$ |
| 40 | 0.077 | (P) 0.070 | (a) $4.1 \times 10^{-6}$ |
| 41 | 0.077 | (P) 0.070 | (b) $4.2 \times 10^{-6}$ |
| 42 | 0.077 | (W) 0.538 | $6.5 \times 10^{-6}$ |
| 43 | 0.077 | (W) 0.538 | (a) $1.1 \times 10^{-5}$ |
| 44 | 0.077 | (W) 0.538 | (b) $6.5 \times 10^{-6}$ |
| 45 | 0.067 | (Si) 0.032 (P) 0.035 (W) 0.180 | $5.3 \times 10^{-6}$ |
| 46 | 0.067 | (Si) 0.032 (P) 0.035 (W) 0.180 | (a) $2.2 \times 10^{-5}$ |

(Al): aluminum compound
(P): phosphorus compound
(Mo): molybdenum compound
(Sr): strontium compound
(a): acid immersing treatment
(Si): silicide
(Ti): titanium compound
(Sn): tin compound
(Ba): barium compound
(b): alkali immersing treatment
(B): baron compound
(W): tungsten compound
(Ca): calcium compound The samples obtained by compounding the zirconic acid compound whose ratio of the conversion weight of $ZrO_2$ to the polyvinyl alcohol is not less than of a ratio of 0.01 is not dissolved to be maintained in a film shape even if each of the samples is washed in the hot water which is not less than 70° C., during an hour. Each of the samples has a high water resistance. The sample of film for comparison, produced only polyvinyl alcohol without the zirconic acid compound in a manner similar to the above-mentioned, is soon dissolved in the hot water. Namely, the sample including only polyvinyl alcohol has a low water resistance. As readily understood from the above-mentioned results, the water resistance of polyvinyl alcohol is remarkably improved by compounding the zirconic acid compound.

The measurement of ion conductivity is carried out with respect to each of the produced sample films on the basis of a following method. Each of samples is cut into a circular sample having a diameter of 30 mm. The circular sample is sandwiched between two platinum circular plates each of which has a diameter of 28 mm. A brass circular plate is located on the outside of each platinum circular plate. Furthermore, they are clipped with an insulated clip. An alternating voltage of 10 mV is applied to a lead wire attached to the brass circular plates by using an LCR meter, with variation of frequencies of 5 MHz to 50 MHz.

Responses are measured with respect to current and phase angle. The ion conductivity are calculated on the basis of a diameter of a semi-circle of Cole-Cole plots which is used in general. Incidentally, each of the samples is positioned in a vessel of constant temperature and humidity which is controlled to the temperature of 50° C. and the relative humidity of 90%, on measurement. Description is made as regards the measurement results in Table 1.

In case where a ratio of the converted weight of zirconic acid compound to the polyvinyl alcohol weight is not less than of a ratio of 0.07 as shown in the samples NO.3 to No.8 (rounding off the number 0.067 to two decimal places in samples No.3 and No.4 inasmuch as it is significant to carry out an judgment in accordance with the number of second decimal place. Rounding off the number to two decimal place in each of the other samples), before the immersing treatment, each of the produced samples does not have the high ion conductivity. Concretely, the produced samples have orders of $10^{-8}$ to $10^{-7}$S/cm before the immersing treatment. After the alkali immersing treatment, the samples have high ion conductivities which is orders of $10^{-6}$ to $10^{-5}$S/cm. Incidentally, the ion conductivities are approximately order of $10^{-7}$S/cm, respectively, in the samples No.1 and No.2 whose ratio of the zirconic acid compound weight to the polyvinyl alcohol is less than of a ratio of 0.07, even if the alkali immersing treatment is carried out. Therefore, it is desired that the ratio of the zirconic acid compound weight to the polyvinyl alcohol is not less than of a ratio of 0.07.

Samples No.9 to No.38 are obtained by the above-mentioned process except that aluminum chloride, titanium chloride, strontium chloride, barium chloride, or boric acid is added into the primary solution, alternatively, sodium silicate, tertiary sodium phosphate, sodium tungstate, sodium molybdate, or sodium slannate is added into the alkali using neutralization. Incidentally, symbols (Al), (Si), (B), (p), (Ti), (W), (Mo), (Sn), (Ca), (Sr), and (Ba) represent additions of aluminum, silicon, boron, phosphorus, titanium, tungsten, molybdenum, tin, calcium, strontium, and barium compound, respectively, in Table 1. The above-mentioned additives are converted into the weights of $Al_2O_3$, $SiO_2$, $B_2O_3$, $P_2O_5$, $TiO_2$, $WO_3$, $MoO_3$, $SnO_2$, $CaO$, $SrO$, and $BaO$, respectively, and each of the additives is represented as a weight ratio to polyvinyl alcohol. In case of adding any one of the additives, the ion conductivity has orders of $10^{-5}$ to $10^{-4}$S/cm when the alkali immersing treatment is carried out. The ion conductivity is maintained or improved in comparison with that of only zirconic acid compound. The ion conductivity is remarkably improved in the case of the strontium and barium addition.

(Embodiment 2)

Description will be made as regards an example in which the electrolyte film is produced in a manner different from Embodiment 1. A predetermined amount of sodium tungstate, the tertiary sodium phosphate or the sodium silicate are dissolved in 2 weight % solution of polyvinyl alcohol. The neutralization is carried out by adding hydrochloric acid of 1.2M concentrations that includes zirconium oxychloride octahydrates ($ZrCl_2O.8H_2O$), to the produced solution. After that, the neutralized solution pours into two petri dishes each of which has a diameter of 90 mm and is dried under a temperature of 50° C., in order to remove water used as solvent. After the dry process, a film remaining on each petri dish is stripped off from the petri dish to be subjected to a heating treatment in an oven under a temperature of 100° C. during three hours in air. Furthermore, the thin film is cleaned in hot water of 70–80° C. after the heating treatment. The samples produced in above-mentioned process are represented as samples No.39 to No.46 in Table 1. Each of samples No.39 to No.46 has a high ion conductivity of orders of $10^{-6}$ to $10^{-5}$S/cm.

Incidentally, in case where the heating treatment is not carried out under the temperature of 100° C., it is difficult to maintain the film shape in most samples shown in Table 1 inasmuch as the strength considerably reduces in the cleaning or washing process with the hot water. Therefore, it is preferable to carry out the heating treatment under a temperature which is not less than 100° C., in the manufacturing process of the electrolyte material according to the present invention.

It is unnecessary to use a perfect object as the above-mentioned polyvinyl alcohol. It is possible to use a material which essentially functions as the polyvinyl alcohol. For example, the material in which a part of hydroxyl group is replaced by another group is able to function as the polyvinyl alcohol. In addition, the material made by the copolymerization of another polymer is able to function as the polyvinyl alcohol. Furthermore, it is possible to use polyvinyl acetate which is a raw material of the polyvinyl alcohol, as a starting material, inasmuch as the similar effect is obtained when producing the polyvinyl alcohol in the reaction process of the present invention.

Within a range in which the function of the polyvinyl alcohol according to the present invention significantly appears, it is possible to carry out mixture of any one of other polymers. The other polymers may be, for example, polyolefin polymer such as polyethylene or polypropylene, polyacrylic polymer, polyether polymer such as polyethylene oxide or polypropylene oxide, fluorinated polymer such as polytetrafluoro-ethylene or polyfluoro-vinyliden, polysaccharide such as methyl cellulose, polyvinyl acetate polymer, polystyrene polymer, polycarbonate polymer, and epoxy resin polymer. Furthermore, it is possible to carry out a mixture of other organic additives or inorganic additives.

It is possible to use various kinds of the zirconium salt and the oxyzirconnium salt if they can be dissolved in water. Furthermore, it is possible to freely choose a ratio of oxygen and negative ion. In addition, it is possible to freely choose a ratio of water.

In the solution according to the present invention, water is essentially used as a solvent. Other solvents may exist whose amount are less than the included water. Although it is possible to add aluminum, silicon, boron, phosphorus, titanium, tungsten, molybdenum, tin, calcium, strontium, and barium compound in the material, at least one selected from the aluminum salt, the titanium salt, the calcium salt, the strontium salt, the barium salt, and the boric acid are dissolved in the primary solution together with the zirconium salt or the oxyzirconnium salt. Alternatively, alkali metal salt selected from the silicic acid, the boric acid, the phosphoric acid, the tungstic acid, the molybdic acid and the stannic acid is added in the alkali for neutralizing the aqueous solution. It is possible to use various kinds of the aluminum salt, the titanium salt, the calcium salt, the strontium salt, and the barium salt if they can be dissolved in water. Furthermore, it is possible to freely choose a ratio of oxygen and negative ion. In addition, it is possible to freely choose a ratio of water.

It is possible to use any material with no concern to kinds of alkali metal ions, composition of alkali metal ions, and ratio of included water, with respect to alkali metal salt of silicic acid, boric acid, phosphoric acid, tungstic acid, molybdic acid, or stannic acid. For example, it is possible to use water-glass in case of silicate. These salts may be added in form of mixture of at least two kinds of salts. In addition, it is possible to use a salt of heteropoly acid as a raw material. The heteropoly acid may be, for example, an acid selected from tungstophosphoric acid, molybdophosphoric acid, silicotungstic acid, silicomolybdic acid, tungstoboric acid, and molybdoboric acid which are obtained by previously compounding tungstic acid or molybdic acid to phosphoric acid, silicic acid, or boric acid. Although it is possible to use any one of primary phosphate, secondary phosphate, and tertiary phosphate as the phosphate, the primary phosphate is not desired inasmuch as the primary phosphate has neutralized the silicate or the borate already when entering the primary phosphate into the raw solution, in case where the silicate or the borate exists in the raw solution.

It is possible to use any kind of alkali by which neutralization is carried out with respect to zirconium salt or oxyzirconnium salt. It is possible to use sodium hydroxide, potassium hydroxide, or lithium hydroxide. In addition, an acid may be previously added in the raw solution including the zirconium salt or the oxyzirconnium salt, in order to perfectly carry out the neutralization reaction, in case where the alkali for neutralization includes an amount of alkali metal salts of the silicic acid, the boric acid, the phosphoric acid, the tungstic acid, the molybdic acid, or the stannic acid, as described in the Embodiment 2. Incidentally, there are two ways of the neutralization operation, that is, the alkali is added to the raw solution including the zirconium salt or the oxyzirconnium salt, and the raw solution is added to the alkali. Either way is permitted so long as the neutralization reaction is carried out in a condition of dissolving the polyvinyl alcohol and the zirconium salt or the oxyzirconnium salt. In a previous step of the neutralization operation, the polyvinyl alcohol may exist in the raw solution or the alkali.

The water used as the solvent is removed from the solution neutralized by the alkali, on heating dry, in order to process the complex compound into a desired shape such as a thin film. The processed complex compound is subjected to the heating treatment under a temperature which is not less than the temperature of 100° C., in order to stimulate the condensation polymerization reaction of zirconic acid compound and the joint production of the aluminum, the silicon, the boron, the phosphorus, the titanium, the tungsten, the molybdenum, the tin, the calcium, the strontium, the barium compound, and the polyvinyl alcohol. As a result, it is possible to increase the strength, the water resistance, and the high-temperature stability of the complex compound. In case where the heating treatment is not carried out, the problem occurs in which the strength reduces in a high temperature water. The heating treatment may be carried out in an inert gas atmosphere or a vacuum atmosphere. Incidentally, it is possible to obtain a significant heat resistance even though the heating treatment is carried out under a temperature which is less than the temperature of 100° C., in case of a sample including the silicic acid compound of 0.032 or more in a ratio of the polyvinyl alcohol to the silicic acid compound.

In the previous step or the subsequent step of the heating treatment process, the complex compound is washed by using the solvent such as water, in order to remove the unnecessary salts from the complex compound. The oxidation reduction reaction occurs at the electrodes in any electrochemical system using the solid electrolyte. Inasmuch as free ions, which are not fixed to the solid electrolyte in negative ions introduced by the acid on neutralization, adversely affect the oxidation reduction reaction, it is necessary to remove the unnecessary salts which are free ions, by washing.

The ratio of the zirconic acid compound weight of $ZrO_2$ to the polyvinyl alcohol weight is limited to a ratio which is not less than 0.01, in the complex compound. Preferably, the ratio of the zirconic acid compound weight of $ZrO_2$ to the polyvinyl alcohol weight is limited to a ratio which is not less than 0.07, in the complex compound. In case where the weight ratio is less than 0.01, it is difficult to obtain a significant water resistance. In case where the weight ratio is less than 0.07, it is difficult to obtain the high ion conductivity.

In case of obtaining an acidic proton conductive solid electrolyte, the produced complex compound is subjected to an acid immersing treatment, in order to allow a proton site to perfectly proton shift. It is possible to increase the ion conductivity by increasing the proton concentration. It is possible to use any acid which contributes to the proton shift, as the acid for using the immersing treatment. For example, it is possible to hydrochloric acid, sulfuric acid, or phosphoric acid. The acid immersing treatment is more effective in the electrolyte including the phosphoric acid compound or the tungstic acid compound.

In case of obtaining the alkali type proton conductive solid electrolyte or the hydroxide ion conductive solid electrolyte, the produced complex compound is subjected to the immersing treatment of alkali solution, in order to perfectly alkalize the produced complex compound. As a result, it is possible to increase the ion conductivity. It is possible to use any alkali for immersing treatment which alkalizes the produced complex compound. For example, it is possible to use the solution of the sodium hydroxide, the potassium hydroxide, or the lithium hydroxide. Alternatively, it is possible to use the solution of alkali metal salt of the silicic or the boric acid. The alkali immersing treatment is effective in case where the inorganic compound included in the electrolyte has only zirconic acid compound, or in case where the inorganic compound included in the electrolyte has the aluminum, the silicon, the boron, the phosphorus, the titanium, the tungsten, the molybdenum, the tin, the calcium, the strontium, and the barium compound. Incidentally, it is not necessary to use the aqueous solution on carrying out the acidic or alkali immersing treatment.

When the proton site of the compound is occupied by alkali metal ions, it is possible to easily alkalize the high ion conductive solid electrolyte obtained according to the present invention. The alkali form also exhibits the high proton or the hydroxide ion conductivity and it is possible to use a comparatively cheap material such as nickel, as the electrodes and other system configuration materials, by alkalizing the solid electrolyte. As a result, it is possible to reduce the cost of entire system.

Furthermore, it is possible to apply the solid electrolyte to the primary battery or the secondary battery when alkalizing the solid electrolyte. When the electrolytic material according to the present invention is used instead of the conventional electrolytic solution, it is possible to prevent leakage of electrolytic solution. When using the alkali type solid electrolyte, it is possible to realize the secondary battery having a difficulty of realization in the prior art, that is, for example, a high energy density battery which uses a multivalent metal having bivalent or more, as a negative electrode. An example is a nickel zinc battery which uses zinc oxide as the negative electrode and uses a nickel hydroxide as the positive electrode that is similar to the positive electrode of nickel hydride battery. In the nickel zinc battery, the zinc oxide is reduced into the metal zinc in the negative electrode on charging. On discharging the zinc is electrochemically oxidized into the zinc oxide, as shown in following formulas (12) and (13).

(Charge) $Zn+H_2O+2e^- \rightarrow Zn+2OH^-$ (12)

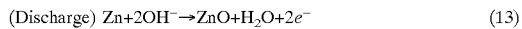
(Discharge) $Zn+2OH^- \rightarrow ZnO+H_2O+2e^-$ (13)

Although the nickel zinc battery has a high storing energy density inasmuch as zinc has bivalent, zinc oxide is easily dissolved in the alkali electrolytic solution. The zinc ions are released from the electrode. When the releases zinc ions are reduced on charging, needle shaped metal zinc is produced and the needle shaped metal zinc penetrates a separator so that the needle shaped metal zinc makes a short circuit. Furthermore, the zinc is oxidized by water in a charging state so that the self-discharge easily occurs, inasmuch as the oxidation reduction potential of zinc is less than that of hydrogen. In addition, hydrogen is produced from the zinc electrode on charging so that the charging efficiency decreases. Therefore, it is difficult to realize a battery particularly using liquid electrolyte. When the high ion conductive electrolyte according to the present invention is used, releases of metal ions are restricted. Even though the metal ions are slightly released from the electrode, the released metal ions are slowly diffused from the electrode. As a result, possibility is low in which the needle shaped metal is produced. Even if the needle shaped metal is produced, it is possible for the solid electrolyte to prevent penetration from the negative electrode to the positive electrode. Furthermore, the self-discharge hardly occur with respect to the metal which has a oxidation reduction potential less than that of hydrogen inasmuch as water included in the solid electrolyte has a poor reactivity. Inasmuch as electrolysis of water hardly occurs which is competed with the reduction reaction of metal, the charging efficiency is improved. In other words, the charging efficiency is improved inasmuch as the reduction reaction hardly occurs with respect to protons. It is possible to have an effect similar to above-mentioned effect on the primary battery or the nickel hydride battery with respect to the release of metal ions and the diffusion of metal ions and the restriction of production of needle shaped metal. Furthermore, there is a similar merit to the above-mentioned also on an air zinc battery using an air electrode as the positive electrode. It is possible to obtain a battery which is easily able to carry out charge inasmuch as oxygen penetration to the zinc electrode is restricted.

There are many metals having bivalent or more, for example, copper, cobalt, iron, manganese, chrome, vanadium, tin, molybdenum, tungsten, silicon, boron, and aluminum each of which has bivalent or more. As a result, it is possible to realize the secondary battery using one of the above-mentioned metals when using the solid electrolyte according to the present invention.

Although a porous separator soaking up the alkali electrolytic solution is used in an alkali secondary battery such as nickel hydride battery, in the prior art, it is unnecessary to use the electrolytic solution or it is possible to decrease the amount of the electrolytic solution inasmuch as the electrolyte according to the present invention has both functions of electrolytic solution and separator. As a result, it is possible to improve the energy density of the battery. In addition, it is possible to use a thin film type electrode having a large surface area, inasmuch as the electrolyte according to the present invention can prevent a short circuit which occurs in the porous separator, even if the electrolyte according to the present invention is shaped into the thin film.

Because the solid electrolyte according to the present invention is made of cheap materials and is made on the basis of simple aqueous solution process, the solid electrode according to the present invention is very cheap in comparison to a known perfluoro sulfonic acid electrolyte. Furthermore, it is easy to process the solid electrolyte according to the present invention, into the thin film, inasmuch as the solid electrolyte according to the present invention has flexibility in comparison to an inorganic solid material. In case of compounding polyethylene oxide and silicon compound, as having a try in a prior art, it is difficult to produce the complex compound having a hot water resistance even if the method of the present invention is used. It is necessary to use the method of high cost such as the sol-gel process. However, it is possible to use the aqueous solution process of low cost with easy manufacturing, when polyvinyl alcohol is selected as described in the present invention.

Inasmuch as the solid electrolyte according to the present invention has the proton conductivity, it is possible to use the solid electrolyte in each of the fuel cell, the steam pump, the dehumidifier, the air conditioner, the electrochromic device, the electrolytic device, the electrolytic hydrogen producing device, the electrolytic hydrogen peroxide producing apparatus, the electrolyzed water producing apparatus, the humidity sensor, and the hydrogen sensor in a manner similar to conventional perfluoro sulfonic acid ion exchange film. Inasmuch as the above-mentioned electrolyte also has the high ion conductivity in the alkali type, it is possible to use the solid electrolyte in the electrochemical system such as the primary battery, the secondary battery, or the optical switch system. Furthermore, it is possible to the solid electrolyte in the new battery system using the multivalent metal.

As described above, the present invention is characterized in neutralizing the zirconium salt or the oxyzirconnium salt and other additional salts in the aqueous solution having the polyvinyl alcohol, by alkali and removing the unnecessary salt to produce the complex compound after removing the water used as solvent. Inasmuch as it is possible to easily produce the organic and inorganic complex compound having both of water absorption and water resistance in the method using the aqueous solution, it is possible to obtain the high ion conductive solid electrolyte of low cost and the electrochemical system using the high ion conductive solid electrolyte.

Although the conjunctive condensation polymerization occurs with the zirconic acid when neutralization is carried out in the solution including only the zirconium salt or oxyzirconnium salt, entwining occurs between the polyvinyl alcohol and the zirconic acid compound in micron order according to the present invention inasmuch as the solution has the polyvinyl alcohol. It is possible to obtain the solid complex compound having strength and flexibility inasmuch as the conjunctive condensation polymerization is promoted by heating. In addition, the complex compound is not dissolved in the hot water by the tight conjunction with zirconic acid compound although a single polyvinyl alcohol is dissolved in the hot water. As a result, it is possible to keep the physical properties under the high temperature and high wet environment. Furthermore, it is possible for the complex compound to absorb much water and to have the high ion conductivity, inasmuch as each of the polyvinyl alcohol and the zirconic acid compound has an affinity of water, although the complex compound has the water resistance. Therefore, water included in the complex compound composed of the polyvinyl alcohol and the zirconic acid compound becomes a medium for diffusing the protons or the hydroxide ions at a high speed.

In addition, it is possible to compound aluminum, silicon, boron, phosphorus, titanium, tungsten, molybdenum, tin, calcium, strontium, or barium compound when the raw aqueous solution including zirconium salt or oxyzirconnium salt has aluminum salt, titanium salt, calcium salt, strontium salt, barium salt, or boric acid or when the alkali for neutralization of the raw aqueous solution has the alkali metal salt of silicic acid, boric acid, phosphoric acid, tungstic acid, molybdic acid, or stannic acid. It is possible to improve the properties by compounding the above-mentioned third or fourth component. Furthermore, it is possible to decrease cost inasmuch as the amount of zirconium salt or oxyzirconnium salt decreases by compounding the above-mentioned third or fourth component.

It is possible to use the solid electrolyte in the electrochemical system such as the fuel cell, the steam pump, the dehumidifier, the air conditioner, the electrochromic device, the electrolytic device, the electrolytic hydrogen producing device, the electrolytic hydrogen peroxide producing apparatus, the electrolyzed water producing apparatus, the humidity sensor, the hydrogen sensor, the primary battery, the secondary battery, the optical switch system, or the new battery system using the multivalent metal. It is possible to contribute to low price of the above-mentioned electrochemical system. Furthermore, when the alkali type electrolyte is employed, it is possible to use the material of low price as a peripheral member in the electrochemical system, such as an electrode.

What is claimed is:

1. A highly ion-conductive solid electrolyte, comprising:
   a complex compound which is produced by combining polyvinyl alcohol with zirconic acid compound having water.

2. A highly ion-conductive solid electrolyte, comprising:
   a complex compound having zirconic acid compound, polyvinyl alcohol, and water, said complex compound being produced by removing unnecessary salt after neutralizing aqueous solution obtained by dissolving polyvinyl alcohol and zirconium salt or oxyzirconium salt in water, by alkali and removing the water used as solvent.

3. A highly ion-conductive solid electrolyte as claimed in claim 2, wherein a heating treatment is carried out in a temperature, which is not less than 100° C., before or after removing said unnecessary salt.

4. A highly ion-conductive solid electrolyte as claimed in claim 1, wherein a ratio of weight of $ZrO_2$ included in the zirconic acid compound to the polyvinyl alcohol weight is not less than of a ratio of 0.01.

5. A highly ion-conductive solid electrolyte as claimed in claim 1, wherein a ratio of weight of $ZrO_2$ included in the zirconic acid compound to the polyvinyl alcohol weight is not less than of a ratio of 0.07.

6. A highly ion-conductive solid electrolyte as claimed in claim 1, wherein said highly ion-conductive solid electrolyte includes at least one selected from aluminum, silicon, boron, phosphorus, titanium, tungsten, molybdenum, tin, calcium, strontium, and barium compound.

7. A highly ion-conductive solid electrolyte as claimed in claim 2, wherein said aqueous solution having the zirconium salt or the oxyzirconium salt includes at least one selected from an aluminum salt, titanium salt, calcium salt, strontium salt, barium salt, and boric acid, or the alkali for neutralizing the aqueous solution including at least one alkali metal salt selected from silicic acid, boric acid, phosphoric acid, tungstic acid, molybdic acid, and stannic acid, the produced complex compound including at least one selected from aluminum, silicon, boron, phosphorus, titanium, tungsten, molybdenum, tin, calcium, strontium, and barium compound.

8. A highly ion-conductive solid electrolyte as claimed in claim 1, wherein the complex compound is subjected to an immersing treatment under an acid solution.

9. A highly ion-conductive solid electrolyte as claimed in claim 1, wherein the complex compound is subjected to an immersing treatment under an alkali solution.

10. An electrochemical system comprising said highly ion-conductive solid electrolyte claimed in claim 1.

11. An electrochemical system using the highly ion-conductive solid electrolyte as claimed in claim 10, wherein said electrochemical system is any one of a fuel cell, a steam pump, a dehumidifier, an air conditioner, an electrochromic device, an electrolytic device, an electrolytic hydrogen producing device, an electrolytic hydrogen peroxide producing apparatus, an electrolyzed water producing apparatus, a humidity sensor, a hydrogen sensor, a primary battery, a secondary battery, an optical switch system, or a new battery system using a multivalued metal.

* * * * *